United States Patent
Bürgler et al.

(10) Patent No.: US 8,419,825 B2
(45) Date of Patent: Apr. 16, 2013

(54) METHOD AND SYSTEM FOR ENERGY-OPTIMIZED AND $CO_2$ EMISSION-OPTIMIZED IRON PRODUCTION

(75) Inventors: Thomas Bürgler, Steyregg (AT); Stephan Lackner, Linz (AT); Robert Millner, Loosdorf (AT); Reinhard Redl, Linz (AT); Bernhard Rummer, Linz (AT); Herbert Schmid, Sipbachzell (AT); Johann Wurm, Bad Zell (AT); Andreas Zobernig, Leonding (AT)

(73) Assignee: Siemens Vai Metals Technologies GmbH (AT)

( * ) Notice: Subject to any disclaimer, the term of this patent is extended or adjusted under 35 U.S.C. 154(b) by 284 days.

(21) Appl. No.: 13/054,549

(22) PCT Filed: Jun. 24, 2009

(86) PCT No.: PCT/EP2009/057871
§ 371 (c)(1),
(2), (4) Date: Jan. 17, 2011

(87) PCT Pub. No.: WO2010/006905
PCT Pub. Date: Jan. 21, 2010

(65) Prior Publication Data
US 2011/0120266 A1 May 26, 2011

(30) Foreign Application Priority Data

Jul. 17, 2008 (AT) .................. A 1116/2008

(51) Int. Cl.
*C21B 11/08* (2006.01)
*C21B 13/14* (2006.01)

(52) U.S. Cl.
USPC ............... 75/492; 75/500; 75/505; 266/156; 266/157; 266/168; 266/171

(58) Field of Classification Search .................. 75/492, 75/500, 505; 266/156, 157, 171, 168
See application file for complete search history.

(56) References Cited

U.S. PATENT DOCUMENTS 5,989,308 A 11/1999 Kepplinger et al.
6,251,162 B1 * 6/2001 Eichberger et al. ............. 75/492

FOREIGN PATENT DOCUMENTS

AT 405523 B 9/1999
(Continued)

OTHER PUBLICATIONS

International Search Report dated Aug. 20, 2009, issued in corresponding international application No. PCT/EP2009/057871.

*Primary Examiner* — George Wyszomierski
*Assistant Examiner* — Tima M McGuthry Banks
(74) *Attorney, Agent, or Firm* — Ostrolenk Faber LLP

(57) ABSTRACT

A process for energy- and emission-optimized iron production and an installation for carrying out the process. A first partial amount of a generator gas produced in a melter gasifier is used as a first reducing gas in a first reduction zone. A second partial amount is fed to at least one further reduction zone as a second reducing gas. In addition, after $CO_2$ scrubbing, a partial amount of top gas removed from the first reduction zone is admixed with the generator gas after the latter leaves the melter gasifier, for cooling the generator gas.

18 Claims, 2 Drawing Sheets

FOREIGN PATENT DOCUMENTS

| | | |
|---|---|---|
| AT | 409634 B | 9/2002 |
| EP | 0179014 A2 | 4/1986 |
| WO | WO 97/13880 A | 4/1997 |
| WO | WO 97/33006 A1 | 9/1997 |

* cited by examiner

METHOD AND SYSTEM FOR ENERGY-OPTIMIZED AND $CO_2$ EMISSION-OPTIMIZED IRON PRODUCTION

CROSS-REFERENCE TO RELATED APPLICATIONS

The present application is a 35 U.S.C. §§371 national phase conversion of PCT/EP2009/057871, filed Jun. 24, 2009 which claims priority of Austrian Application No. A1116/2008 filed Jul. 7, 2008, the contents of which are incorporated by reference herein. The PCT International Application was published in the German language.

BACKGROUND OF THE INVENTION

The present invention relates to a process for energy- and emission-optimized iron production and to an installation for carrying out the process.

In smelting reduction processes for producing pig iron, a so-called generator gas, which contains CO and $H_2$ as reducing components, is produced from carbon carriers and gas containing oxygen. The generator gas is used as a reducing gas in an assigned reduction reactor. The sponge iron produced in the reduction reactor is charged into the melter gasifier to produce liquid pig iron. Since the generator gas has too high a temperature for the processes that take place in the reduction reactor, it is cooled down to the temperature required in the reduction reactor by introducing a cooling gas. WO9733006 shows a direct reduction installation in which cooling gas is provided by cooling part of the generator gas in a gas-dust scrubber. A disadvantage of this is that large amounts of energy are given off from the generator gas into the water of the gas-dust scrubber without being used in the production of the iron.

The reduction reactor does not use up the entire content of reducing components in the reducing gas for the reduction to sponge iron, with the result that the top gas removed from the reduction reactor still has reducing power. It is known from WO9733006 to use the reducing components that remain in the top gas for producing iron in a further reduction shaft. For this purpose, a mixture of the scrubbed top gases of the reduction reactor and of the further reduction shaft are freed of the non-reducing $CO_2$ component, heated by means of heat exchangers and post-combustion in reducing gas furnaces and, possibly after being brought together with a partial amount of the generator gas cleaned of dust, introduced into the further reduction shaft. The mixture of the scrubbed top gases of the reduction reactor and the further reduction shaft is rich in $CO_2$, since reducing work is carried out in both reduction units. One disadvantage of this way of performing the process is the necessity for the mixture that is cool as a result of the scrubbing of the top gases to be laboriously heated to the temperature required in the further reduction shaft. Another disadvantage is the dissipation of large amounts of energy to the water of the gas-dust scrubber without being used for producing iron. Furthermore, the parts of the installation for heat exchange and for post-combustion must be designed to be large enough to cope with the amounts of gas that are fed to the further reduction shaft, which have to cover a large part of its reducing gas requirements. Correspondingly large parts of the installation are more laborious to operate and need energy to function, for example as combustible gas to be used in the reducing gas furnaces, which increases the energy consumption of the overall installation per unit of quantity of iron produced. Since the energy requirement is covered by fossil energy sources, increased energy consumption automatically also means increased $CO_2$ emissions.

SUMMARY OF THE INVENTION

It is the object of the present invention to provide a process in which the energy required for producing a unit of quantity of iron and the associated $CO_2$ emissions are reduced. Similarly, an installation for carrying out such a process is to be provided.

This object is achieved by a process for producing liquid pig iron or liquid primary steel products and sponge iron from charge materials that are formed from iron ore, preferably in lump form, and possibly additions, wherein the charge materials are reduced directly into sponge iron in a first reduction zone, the sponge iron is smelted in a melter gasifier while carbon carriers and gas containing oxygen are fed in, and a generator gas containing CO and $H_2$ is produced and, after being discharged from the melter gasifier, is first cooled and then dedusted, and the first partial amount of the reducing gas obtained in this dedusting is introduced as a first reducing gas into the first reduction zone, where it is converted and drawn off as top gas, which is subsequently subjected to dust scrubbing and, once dust scrubbing has taken place, is partly or completely subjected to compression and $CO_2$ scrubbing, characterized in that, after the $CO_2$ scrubbing, at least a partial amount A of the $CO_2$-scrubbed gas is admixed with the generator gas after the latter leaves the melter gasifier, wherein the cooling of the generator gas takes place, and a second partial amount of the reducing gas obtained in the dedusting is fed to at least one further reduction zone for the direct reduction of further iron ore, possibly with a partial amount B of the $CO_2$-scrubbed gas being admixed, after being heated, as a second reducing gas. With the process performed in this way, the partial amount A of the $CO_2$-scrubbed gas, which is in any case already cooled as a result of the scrubbing and $CO_2$ removal, is used as cooling gas. Performing the process in this way obviates the need for the cooling gas cycle described in WO9733006, therefore also avoiding energy losses to the water of the gas-dust scrubber of such a cooling gas cycle. Since the top gas emerging from the first reduction zone is at a lower temperature than the generator gas, a smaller temperature difference is overcome in the cooling of the top gas in the gas-dust scrubber, with the result that the energy loss to the water of the gas-dust scrubber for top gas is additionally reduced in comparison with a gas-dust scrubber for generator gas. By reducing the energy losses to the water of the gas-dust scrubber, the specific energy consumption for producing a unit of quantity of iron is consequently reduced, and the $CO_2$ emissions per unit of quantity of iron produced are correspondingly reduced. Moreover, there is the advantage that the partial amount A of the $CO_2$-scrubbed gas that is used as cooling gas is recirculated into the reduction process and the reducing component contained in it can pass once again through the first reduction reactor. This results in better utilization of the reducing power of the reducing components produced in the melter gasifier. Correspondingly, less generator gas has to be produced for the reduction of a certain quantity of iron ore, which in turn reduces the energy consumption and consequently the $CO_2$ emissions per unit of quantity of the product.

A second partial amount of the reducing gas obtained in the dedusting, or possibly a mixture comprising this second partial amount and top gas that has been prepared by dust removal and $CO_2$ removal and heated, is fed to the further reduction zone as the second reducing gas. Since the second partial amount of the reducing gas is neither cooled nor loses reducing power on its way into the further reduction zone, its thermal and chemical energy content is optimally used for the reduction in the further reduction zone, and consequently for producing iron. In addition, making use of the reducing power of the admixed, prepared and heated top gas in the further reduction zone has the effect of improving the utilization of the reducing components produced in the melter gasifier for producing iron.

Iron ore in lump form means both lump ore and pellets.

The second reducing gas is converted in the further reduction zone and drawn off as second top gas. According to an advantageous embodiment of the process according to the invention, after dust scrubbing, the second top gas is brought together with the dust-scrubbed top gas from the first reduction zone and the gas mixture obtained is partly or completely subjected to compression and $CO_2$ scrubbing, further use after the $CO_2$ scrubbing taking place by analogy with partial amount A and partial amount B of the $CO_2$-scrubbed gas.

In this way, the thermal and chemical energy content of the second top gas is also used for producing iron, which in turn reduces the energy consumption, and consequently the $CO_2$ emissions, per unit of quantity of product.

According to a preferred embodiment, during normal operation the second partial amount of the reducing gas obtained in the dedusting contributes 20% by volume to 100% by volume, preferably 20 to 50% by volume, still more preferably 25 to 35% by volume, to the second reducing gas.

Within the scope of the present application, all percentages that are given with reference to gases are percentages by volume. The higher the proportion of the second partial amount of the reducing gas obtained in the dedusting in the second reducing gas, the less the possibly admixed partial amount B of the $CO_2$-scrubbed gas has to be heated, and therefore the specific energy expended for the heating thereof falls. The ratio of the second partial amount of the reducing gas and the partial amount B of the $CO_2$-scrubbed gas is substantially determined by the temperature of the generator gas and the required temperature of the reducing gas for the first reduction zone, by the required temperature of the second reducing gas, and by the temperature of the $CO_2$-scrubbed gas before and after its heating. Within the scope of this application, whenever percentages are given within ranges, the limit values are included.

Normal operation is to be understood in this case as meaning operation after a start-up phase and before a shut-down phase of the installation for carrying out the process according to the invention. The more the second partial amount of the reducing gas contributes to the second reducing gas, the lower the requirements for the heating of the admixed gas. The high temperature of the second partial amount of the reducing gas ensures an adequately high temperature of the second reducing gas for the processes taking place in the further reduction zone. Reduced requirements for the heating of the admixed gas make it possible to use smaller gas heating devices, which in turn require less energy for their operation than larger installations. In this way, the specific energy consumption, and correspondingly the $CO_2$ emission, per unit of quantity of product is further reduced.

According to a preferred embodiment, during normal operation the second partial amount makes up between 5 and 50% by volume, preferably 25 and 40% by volume, particularly preferably 30% by volume, of the overall amount of reducing gas obtained in the dedusting.

For the operation of the further reduction shaft, a certain amount of second reducing gas is necessary. If a large partial amount of the reducing gas obtained after the dedusting is required for reduction purposes in the first reduction zone, only a small partial amount is then available for the further reduction zone. The quantitative difference between this partial amount and the amount of second reducing gas that is required for the operation of the further reduction zone must be made up by admixing a large partial amount B of the $CO_2$-scrubbed gas after it has been heated. However, $CO_2$ occurs during the heating by combustion, and therefore the admixing of a larger partial amount B of the $CO_2$-scrubbed gas after its heating leads to a higher $CO_2$ content in the second reducing gas.

If the proportion of the second partial amount in the overall amount of the reducing gas obtained in the dedusting is less than 5% by volume, a large partial amount B of the $CO_2$-scrubbed gas must be admixed after its heating in order to provide the amount of second reducing gas that is required for the further reduction zone. It is disadvantageous in this case that, in the case in which the partial amount B is heated by combustion of part of the partial amount B, large amounts of reducing components in the partial amount B are oxidized, and are consequently no longer available for reduction purposes in the further reduction zone.

In order to ensure that the first reduction zone is supplied sufficiently with reducing gas, the proportion of the second partial amount in the overall amount of the reducing gas obtained in the dedusting should not be more than 50% by volume.

According to a preferred embodiment, during normal operation the partial amount A of the $CO_2$-scrubbed gas makes up between 15% by volume and 100% by volume of the $CO_2$-scrubbed gas. In the case of less than 15%, the cooling of the hot generator gas and the exact temperature control are no longer possible without an additional cooling gas cycle with a scrubber and a compressor.

The more $CO_2$-scrubbed gas is used as cooling gas, the more reducing components of the top gas are recirculated into the reduction process, the better the utilization of the reducing components produced in the melter gasifier and the less generator gas has to be produced. The admixing of the partial amount A of the $CO_2$-scrubbed gas with the generator gas is preferably controlled in accordance with a temperature preselection for the reducing gas.

The further reduction zone may comprise a solid-bed reduction zone or one or more fluidized-bed reduction zones arranged in series.

More preferably, the further reduction zone is a solid-bed reduction zone, since this type of reduction zone has the advantage of a high degree of metallization with CO-rich reducing gas and simple operation. Iron ore in lump form can then also be processed in the further reduction zone.

The heating of the partial amount B of the $CO_2$-scrubbed gas may take place, for example, with heat exchangers or by means of partial oxidation with an oxygen burner. It advantageously takes place by means of an oxygen burner, since such heating has a high efficiency and low expenditure on equipment, does not require fuel to be fed in from the outside, and produces lower $CO_2$ emission than heat exchangers.

According to a preferred embodiment, the heating of the partial amount B of the $CO_2$-scrubbed gas takes place firstly by means of a heat exchanger to a maximum of 500° C. and then by means of an oxygen burner to above 650° C. In this case, the heat exchange preferably takes place with the first and/or second top gas before the cooling of the latter in the gas-dust scrubbers. Above 500° C., corrosion of the heat exchanger by metal dusting would destroy the heat exchanger. This use of the thermal content of the top gas occurring in any case in the process for the reduction in the further reduction zone minimizes the temperature increase that has to be provided by the oxygen burner, for which reason the latter can be operated with less expenditure on energy and charge materials. Consequently, the energy consumption, and with it the $CO_2$ emissions, per unit of quantity of product is also reduced.

It is also advantageous to use small partial amounts of the $CO_2$-scrubbed gas for tasks in processes according to the invention as a substitute for previously used external gases, that is to say gases not produced in the process, preferably as an injection gas for fine coal injection and/or as a cooling gas when charging charge materials. Charge materials are to be understood as meaning all materials that are charged into the first or further reduction zone or into the melter gasifier.

In the case of these two uses, the gas passes either directly into the first or further reduction zone or passes into the melter gasifier and from there into the first of further reduction zone. As a result, the reducing constituents contained can take part in the reduction processes. This leads to better utilization of the reducing components produced in the melter gasifier, for which reason less generator gas has to be produced.

So far, nitrogen has mostly been used for fine coal injection or as a cooling gas when charging charge materials, correspondingly resulting in a nitrogen fraction in the reducing gas. This does not take part in the reduction processes and lowers the concentration of reducing constituents in the reducing gas. As a consequence, to allow a certain amount of reducing constituents to circulate, the circulating amount of reducing gas must be greater in comparison with a reducing gas that is not depleted by nitrogen, for which the parts of the installation must be designed. These effects are avoided by providing a substitute for the nitrogen. A maximum of 10% by volume of the $CO_2$-scrubbed gas is used as injection gas for fine coal injection and a maximum of 5% by volume of the $CO_2$-scrubbed gas is used as cooling gas when charging charge materials, to allow sufficient amounts of gas to be available for the other intended uses of this gas.

The product obtained from the further reduction zone, for example partly reduced iron ore (LRI), is advantageously used as a starting material for producing iron in a blast furnace, taking the place of starting material in the form of sinter, pellets and lump ore. Since, when used in this way, the starting material added to the blast furnace is at least already partly reduced, less reducing agent, in particular coke, has to be added to the blast furnace. Altogether, for a given amount of iron product of the process, the overall balance of iron production is improved with respect to energy consumption and $CO_2$ production by the use of LRI in the blast furnace. This improvement is based, inter alia, on the fact that the reduction of iron oxides is partly transferred from the blast furnace to the further reduction zone, since reducing compounds are used more efficiently for reduction there than in the blast furnace. Furthermore, the productivity of the blast furnace is at the same time increased, since the permeability of the blast furnace increases as a result of the replacement of sinter and/or lump ore.

A further subject matter of the present invention is an apparatus for carrying out the process according to the invention, comprising a first reduction reactor for iron ore, preferably in lump form, a melter gasifier, at least one conveying line for the reaction product formed in the first reduction reactor, connecting the melter gasifier to the first reduction reactor, comprising a feed line for carbon carriers, opening out into the melter gasifier, and a feed line for gases containing oxygen, opening out into the melter gasifier, a tap for pig iron, provided on the melter gasifier, and a tap for slag, provided on the melter gasifier, and comprising at least one further reduction reactor for the direct reduction of further iron ore, an outlet line for generator gas, connecting the melter gasifier and a dedusting device, an outlet line for reducing gas from the dedusting device, a line connecting the outlet line for reducing gas from the dedusting device to the first reduction reactor, a top-gas line, which leaves the first reduction gas reactor and opens out into a gas-dust scrubber, an outlet line leaving the gas-dust scrubber, and comprising a discharge line, which is connected to the outlet line leaving the gas-dust scrubber and in which first a gas compressing device, a $CO_2$ scrubbing installation and a gas heating device are arranged one behind the other, characterized in that between the $CO_2$ scrubbing installation and the gas heating device, a return line branches from the discharge line and opens out into the outlet line for generator gas, and the discharge line opens out into a connecting line leaving the outlet line for reducing gas, wherein the connecting line opens out into the further reduction reactor.

According to a preferred embodiment, the further reduction reactor is a solid-bed reduction reactor. Iron ore in lump form can then also be processed in the further reduction reactor.

According to an embodiment, a top-gas outlet line, in which there is a gas-dust scrubber and which opens out into the discharge line upstream of the gas compressing device, leaves the further reduction reactor. In this top-gas outlet line, the second top gas, drawn from the further reduction reactor, is passed to the dust-scrubbed top gas from the first reduction zone.

The gas heating device is preferably an oxygen burner.

According to a further embodiment, a heat exchanger for heating the partial amount B of the $CO_2$-scrubbed gas by the top gas and/or the second top gas is present in the discharge line upstream of the gas heating device and/or in the top-gas outlet line.

For reasons of energy balance, an arrangement of the heat exchanger upstream of the branching of the return line from the discharge line is in this case preferred.

According to another embodiment, a fine-coal injection installation, which is connected to an injection-gas line branching off from the discharge line downstream of the $CO_2$ scrubbing installation, is present on the melter gasifier.

According to a further embodiment, charging devices for charging carbon carriers, such as for example lump coal, coal briquettes or coke, into the melting gasifier are present, charging devices for charging further charge materials, such as for example additions, into the melter gasifier are possibly present, and charging devices for charging iron ore, and possibly additions, into the first and/or the further reduction reactor are present, wherein the charging devices are connected to a cooling line branching off from the discharge line downstream of the $CO_2$ scrubbing installation.

BRIEF DESCRIPTION OF THE DRAWINGS

The invention is schematically represented below by way of three figures.

DESCRIPTION OF A PREFERRED EMBODIMENT

Figure 1:
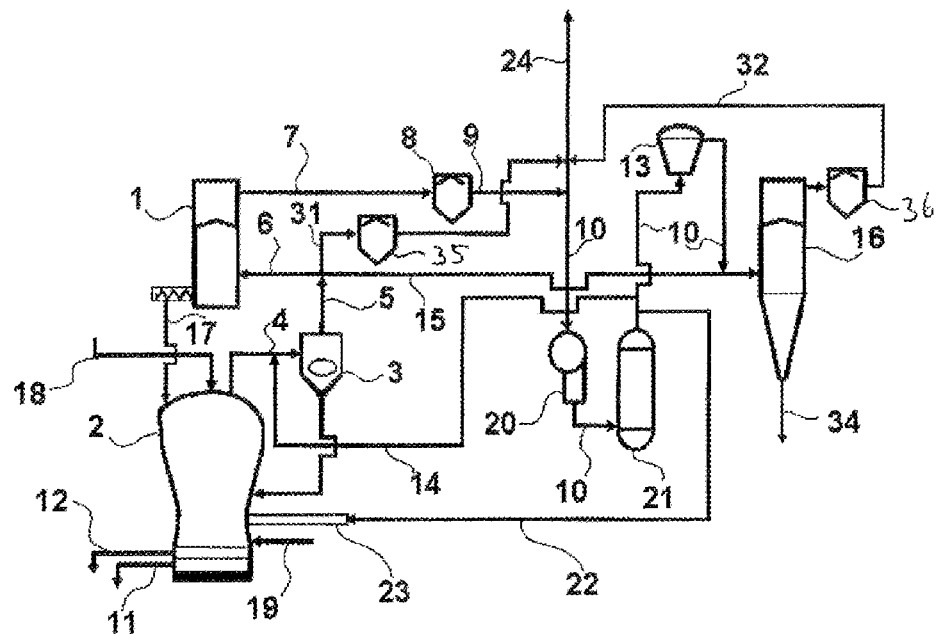
FIG. 1 shows a schematic representation of an installation according to the invention.

In FIG. 1, iron ore in lump form, and possibly additions, are filled into the first reduction reactor 1 for iron ore by way of a charging system that is not represented. The iron ore is reduced to sponge iron by reducing gas introduced into the reduction reactor 1 by way of line 6. In the melter gasifier 2 arranged thereunder, a generator gas containing CO and $H_2$ is produced from carbon carriers, which are charged by way of feed line 18, and from gases containing oxygen, which are introduced into the melter gasifier 2 by way of feed line 19. The sponge iron introduced into the melter gasifier by way of conveying line 17 is thereby smelted. Liquid pig iron and liquid slag produced in the melter gasifier 2 are removed from the melter gasifier by way of a tap 11 for pig iron and a tap 12 for slag. The generator gas is discharged from the melter gasifier 2 by way of an outlet line 4, dedusted in a dedusting device 3, in this case a cyclone, and the reducing gas thereby obtained is discharged from the cyclone by way of an outlet line 5. The first partial amount of the reducing gas is introduced as first reducing gas into the first reduction reactor 1 by way of line 6. After conversion of the first partial amount of the reducing gas in the first reduction reactor 1, top gas is removed from the first reduction reactor by way of a top-gas line 7 and passed to a gas-dust scrubber 8. Once dust scrubbing has taken place, the top gas is discharged from the gas-dust scrubber 8 by way of an outlet line 9. Part of the dust-scrubbed top gas discharged by way of outlet line 9 is drawn off as export gas by way of an export-gas line 24. The other part of the dust-scrubbed top gas discharged by way of outlet line 9 is fed first to a gas compressing device 20, then to a $CO_2$ scrubbing installation 21, by way of a discharge line 10. A partial amount A of the $CO_2$-scrubbed gas discharged from the $CO_2$ scrubbing installation 21 by way of discharge line 10 is admixed with the generator gas discharged from the melter gasifier 2 by way of a return line 14, which branches off from the discharge line 10 and opens out into the outlet line 4 upstream of the dedusting device 3. Since, because it has passed through the gas-dust scrubber 8 and the $CO_2$ scrubbing installation 21, the partial amount A is cooler than the generator gas, the generator gas is cooled by the admixing. The partial amount B, remaining after the branching off of the partial amount A, of the $CO_2$-scrubbed gas discharged from the $CO_2$ scrubbing installation 21 by way of discharge line 10 is passed into a gas heating device 13, in this case an oxygen burner, heated in the latter and passed by way of a continuation of the discharge line 10 out of the oxygen burner to the connecting line 15. In connecting line 15, which connects the further reduction reactor 16 to the outlet line 5, a second partial amount of the reducing gas is carried. Since, before the connecting line 15 opens out into the further reduction reactor 16, the discharge line 10 opens out into the connecting line 15, the partial amount B of the $CO_2$-scrubbed gas that is heated in the oxygen burner is admixed with the second partial amount of the reducing gas. The second reducing gas obtained by this admixing is introduced into the further reduction reactor 16 by way of connecting line 15. In this reactor, it reduces further iron ore introduced by way of charging devices that are not represented.

Between the $CO_2$ scrubbing installation 21 and the gas heating device 13, there branches off from discharge line 10 an injection-gas line 22, through which $CO_2$-scrubbed gas is fed to a fine-coal injection installation 23 on the melter gasifier 2. By way of an excess-gas line 31, in which a gas-dust scrubber 35 is present, reducing gas can be passed from the outlet line 5 directly into the export-gas line 24, if more reducing gas than is required in the reduction reactor 1 and the further reduction reactor 16 is produced.

A top-gas outlet line 32, which leaves the further reduction reactor 16 and in which a gas-dust scrubber 36 is present, opens out into the discharge line 10 upstream of the gas compressing device 20. Through this top-gas outlet line, the second top gas, drawn off from the further reduction reactor 16, can be passed to the dust-scrubbed top gas from the first reduction reactor.

The product of the further reduction reactor 34 is fed to a blast furnace that is not represented as starting material for producing iron in the blast furnace.

Figure 2:
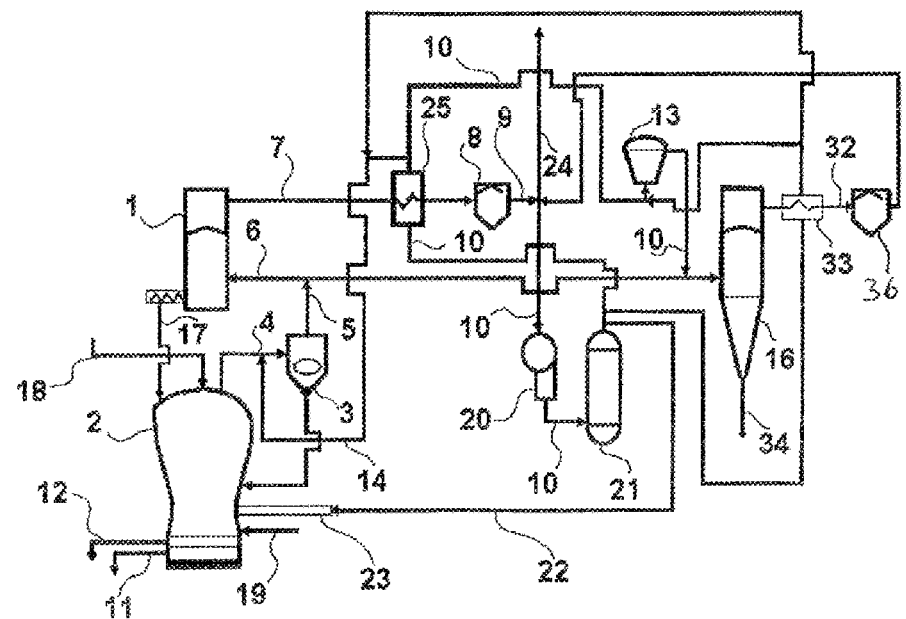
FIG. 2 shows an installation as in FIG. 1, heat exchangers for heating the $CO_2$-scrubbed gas by top gas being additionally present.

FIG. 2 shows an installation as in FIG. 1, wherein a heat exchanger 25 is present in the top-gas line 7 and a heat exchanger 33 is present in the top-gas outlet line 32, for heating $CO_2$-scrubbed gas by top gas. Gas heated in the heat exchanger 33 may either be fed into the discharge line 10 upstream of the gas heating device 13, or be fed into the return line 14. For better overall clarity, representation of the excess-gas line 31, which is likewise present and routed as in FIG. 1, has been omitted in FIG. 2.

Figure 3:
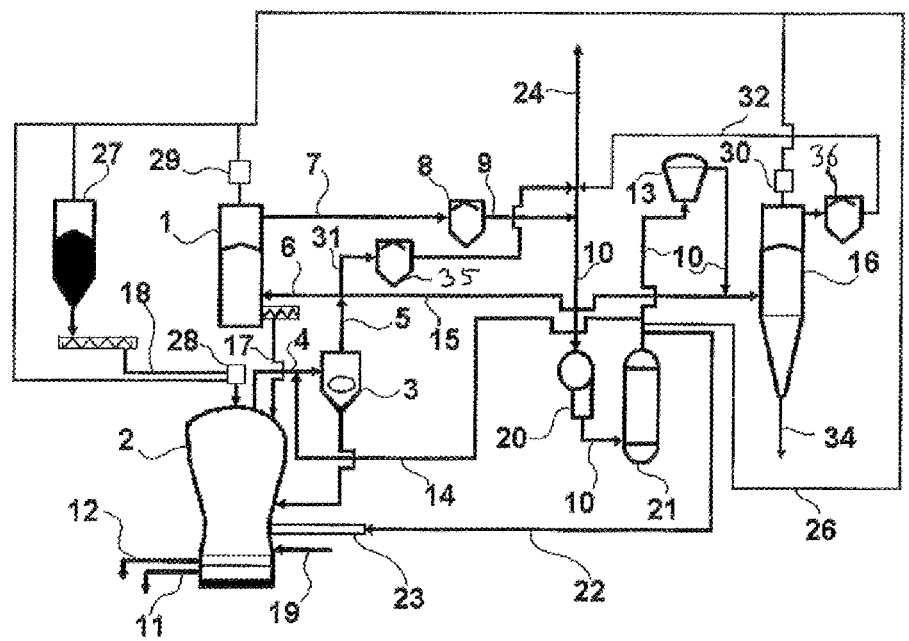
FIG. 3 shows an installation as in FIG. 1, charging devices for charging the melting gasifier being additionally present in the first and further reduction reactors.

FIG. 3 shows an installation as in FIG. 1, wherein a charging device 27 for charging carbon carriers into the melter gasifier, a charging device 28 for charging further charge materials into the melter gasifier, a charging device 29 for charging iron ore and additions into the first reduction reactor and a charging device 30 for charging iron ore and additions into the further reduction reactor are additionally present.

All these charging devices are connected to a cooling line 26. The cooling line branches off from the discharge line 10 downstream of the $CO_2$ scrubbing installation 21. Through the cooling line 26, $CO_2$-scrubbed gas is passed to the charging devices for cooling purposes.

The invention claimed is:

1. A process for producing liquid pig iron or liquid primary steel products and sponge iron from charge materials that are formed from iron ore, comprising:
   reducing the charge materials directly into sponge iron in a first reduction zone, smelting the sponge iron is in a melter gasifier while carbon carriers and gas containing oxygen are fed in, whereby a generator gas containing CO and $H_2$ is produced;
   discharging the generator gas from the melter gasifier;
   first cooling and then dedusting the generator gas produced in the melter gasifier for producing a reducing gas;
   introducing a first partial amount of the reducing gas obtained in the dedusting as a first reducing gas into the first reduction zone, where the first partial amount of the reducing gas is converted to and drawn off as top gas;
   subsequently dust scrubbing the top gas and after the dust scrubbing of the top gas, partly or completely subjecting the top gas to compression and $CO_2$ scrubbing;
   after the $CO_2$ scrubbing of the top gas, admixing at least a first partial amount of the $CO_2$-scrubbed gas with the generator gas that leaves the melter gasifier, wherein the generator gas is cooled;
   obtaining a second partial amount of the reducing gas in the dedusting and admixing the second partial amount of the reducing gas with a second partial amount of the $CO_2$-scrubbed gas, after being heated, for producing a second reducing gas;
   feeding the second reducing gas to at least one further reduction zone for direct reduction of further iron ore, wherein the second partial amount of the reducing gas recovered in the dedusting makes up between 5% by volume and 50% by volume, of the overall amount of the reducing gas obtained in the dedusting.

2. The process as claimed in claim 1, wherein the further reduction zone for the direct reduction of further iron ore is a solid-bed reduction zone.

3. The process as claimed in claim 1, further comprising forming a second top gas in the further reduction zone, dust scrubbing the second top gas and after the dust scrubbing of the second top gas, drawing off the second top gas from the further reduction zone, bringing the second top gas together with the dust-scrubbed top gas from the first reduction zone, and partly or completely subjecting the gas mixture obtained to a second compression and a second $CO_2$ scrubbing.

4. The process as claimed in claim 1, further comprising treating the second partial amount of the $CO_2$-scrubbed gas by oxygen burner.

5. The process as claimed in claim 1, further comprising heating the second partial amount of the $CO_2$-scrubbed gas first by a heat exchanger and subsequently by an oxygen burner to above 650° C.

6. The process as claimed in claim 1, wherein the second partial amount of the reducing gas contributes 20% by volume to 100% by volume to the second reducing gas.

7. The process as claimed in claim 1, wherein during normal operation, the first partial amount of the $CO_2$-scrubbed gas makes up between 15% by volume and 100% by volume of the $CO_2$-scrubbed gas.

8. The process as claimed in claim 1, further comprising controlling the admixing of the first partial amount of the $CO_2$-scrubbed gas with the generator gas with a temperature preselection for the reducing gas.

9. The process as claimed in claim 1, further comprising using a partial amount of up to 10% by volume of the $CO_2$-scrubbed gas as injection gas for fine coal injection.

10. The process as claimed in claim 1, further comprising using a partial amount of up to 5% by volume of the $CO_2$-scrubbed gas as a cooling gas when charging charge materials.

11. The process as claimed in claim 1, further comprising, using a product obtained from the further reduction zone as a starting material for producing iron in a blast furnace.

12. An apparatus for producing liquid pig iron or liquid primary steel products and sponge iron from charge materials that are formed from iron ore, comprising:
a first reduction reactor for reducing iron ore, a melter gasifier, at least one conveying line for conveying a reaction product formed in the first reduction reactor and connecting the melter gasifier to the first reduction reactor, a first feed line for carbon carriers, the first feed line opening into the melter gasifier, a second feed line for gases containing oxygen, the second feed line opening into the melter gasifier,
a tap for pig iron on the melter gasifier; a tap for slag on the melter gasifier; and at least one further reduction reactor for the direct reduction of further iron ore;
an outlet line for generator gas the outlet line connecting the melter gasifier and a dedusting device; an outlet line for reducing gas from the dedusting device; a line connecting the outlet line for reducing gas from the dedusting device to the first reduction reactor;
a top-gas line from the first reduction reactor and into a gas-dust scrubber;
an outlet line from the gas-dust scrubber;
a discharge line connected to the outlet line leaving the gas-dust scrubber and a gas compressing device a $CO_2$ scrubbing installation and a gas heating device arranged one behind the other in the outlet line from the gas-dust scrubber
a return line between the $CO_2$ scrubbing installation and the gas heating device, branching from the discharge line and opening into the outlet line for generator gas, and
the discharge line opening into a connecting line leaving the outlet line for reducing gas, and the connecting line opening into the further reduction reactor.

13. The apparatus as claimed in claim 12, wherein the further reduction reactor is a solid-bed reduction reactor.

14. The apparatus as claimed in claim 12, further comprising a top-gas outlet line from the further reduction reactor, a gas-dust scrubber in the top gas outlet line, the top gas outlet line opening into the discharge line upstream of the gas compressing device.

15. The apparatus as claimed in claim 12, wherein the gas heating device is an oxygen burner.

16. The apparatus as claimed in claim 12, further comprising a heat exchanger for heating the second partial amount of the $CO_2$-scrubbed gas by the top gas and/or the second top gas is present in the discharge line upstream of the gas heating device and/or in the top-gas outlet line.

17. The apparatus as claimed in claim 12, further comprising a fine-coal injection installation present on the melter gasifier; an injection-gas line to which the fine-coal injection installation line is connected, and that line branching off from the discharge line downstream of the $CO_2$ scrubbing installation.

18. The apparatus as claimed in claim 12 further comprising:
first charging devices for charging carbon carriers into the melting gasifier;
second charging devices for charging further charge materials into the melter gasifier, and
third charging devices for charging iron ore, into the first and/or the further reduction reactor
a cooling line branching off from the discharge line downstream of the $CO_2$ scrubbing installation to which the charging devices are connected.

* * * * *